United States Patent [19]

Clark et al.

[11] Patent Number: 4,955,721
[45] Date of Patent: Sep. 11, 1990

[54] APPARATUS FOR APPLYING A SULPHUR-BASED STRUCTURAL MATERIAL TO PAVED SURFACES

[76] Inventors: Lloyd T. Clark, 503 St. Charles St., Arlington, Tex. 76013; James W. Marshall, 4206 Newton St., #104, Dallas, Tex. 75219

[21] Appl. No.: 101,838

[22] Filed: Sep. 28, 1987

[51] Int. Cl.$^5$ .......................... B28C 5/46; B01F 15/02; B01F 15/06

[52] U.S. Cl. ...................................... 366/24; 366/45; 366/46; 366/47; 366/50; 366/79; 366/99; 366/100; 366/186; 366/196; 366/146; 366/149; 366/318; 404/112; 219/388

[58] Field of Search ................. 366/3, 4, 7, 10, 20–24, 366/27–30, 35, 38, 42, 47, 50, 59, 63, 46, 79, 99, 100, 132, 133, 149, 146, 186, 196, 318, 45; 404/95, 79, 80, 112; 219/388

[56] References Cited

U.S. PATENT DOCUMENTS

| | | | |
|---|---|---|---|
| 1,966,647 | 7/1934 | Ross | 366/24 |
| 2,698,167 | 12/1954 | Baumgardner | 366/23 |
| 2,987,302 | 6/1961 | Terry et al. | 366/47 |
| 3,175,812 | 3/1965 | Russell | 366/30 |
| 3,866,669 | 2/1975 | Gardiner | 366/79 |
| 3,885,774 | 5/1975 | Harris et al. | 366/20 |
| 4,555,182 | 11/1985 | Mendenhall | 366/23 |

FOREIGN PATENT DOCUMENTS

| | | | |
|---|---|---|---|
| 26473 | 5/1931 | Australia | 366/38 |
| 35281 | 9/1981 | European Pat. Off. | 366/10 |
| 649643 | 12/1928 | France | 366/22 |
| 0837954 | 6/1981 | U.S.S.R. | 366/22 |
| 1180514 | 9/1985 | U.S.S.R. | 366/10 |
| 2115711 | 9/1983 | United Kingdom | 366/22 |

Primary Examiner—Harvey D. Hornsby
Assistant Examiner—Joseph S. Machuga
Attorney, Agent, or Firm—Charles W. McHugh

[57] ABSTRACT

A portable apparatus adapted for use in filling chuck holes in paved surfaces with a sulphur-based material that has been heated to a plasticized condition. The apparatus includes an electrically heated furnace in which an auger is mounted for the purpose of moving a sulphur-based material through the furnace at a controlled rate (e.g., about 2 feet per minute), such that the material will be elevated to a temperature of above 305 degrees Farenheit (the melting point of sulphur) to produce a tenacious filler material. The furnace is heated by tubular resistance heaters that are bent in a spiral fashion around a mandrel, so that they may be placed in intimate contact with the exterior of a tube which constitutes the core of the furnace. The furnace is fed by a hopper that is mounted above the entry point for the auger, so that dry material may be fed—by gravity—into the furnace whenever a gate-valve mechanism is opened. The furnace and its hopper are relatively light weight, typically weighing only about 360 pounds, and are readily moved about by one person when supporting wheels are installed on the bottom of a frame that supports the furnace. A tandem-axle trailer provides an optimum way of transporting the furnace and the ancillary materials and equipment that are used with the furnace, e.g., a portable generator, a small air compressor, bags of the hole-filling material, etc.

3 Claims, 3 Drawing Sheets

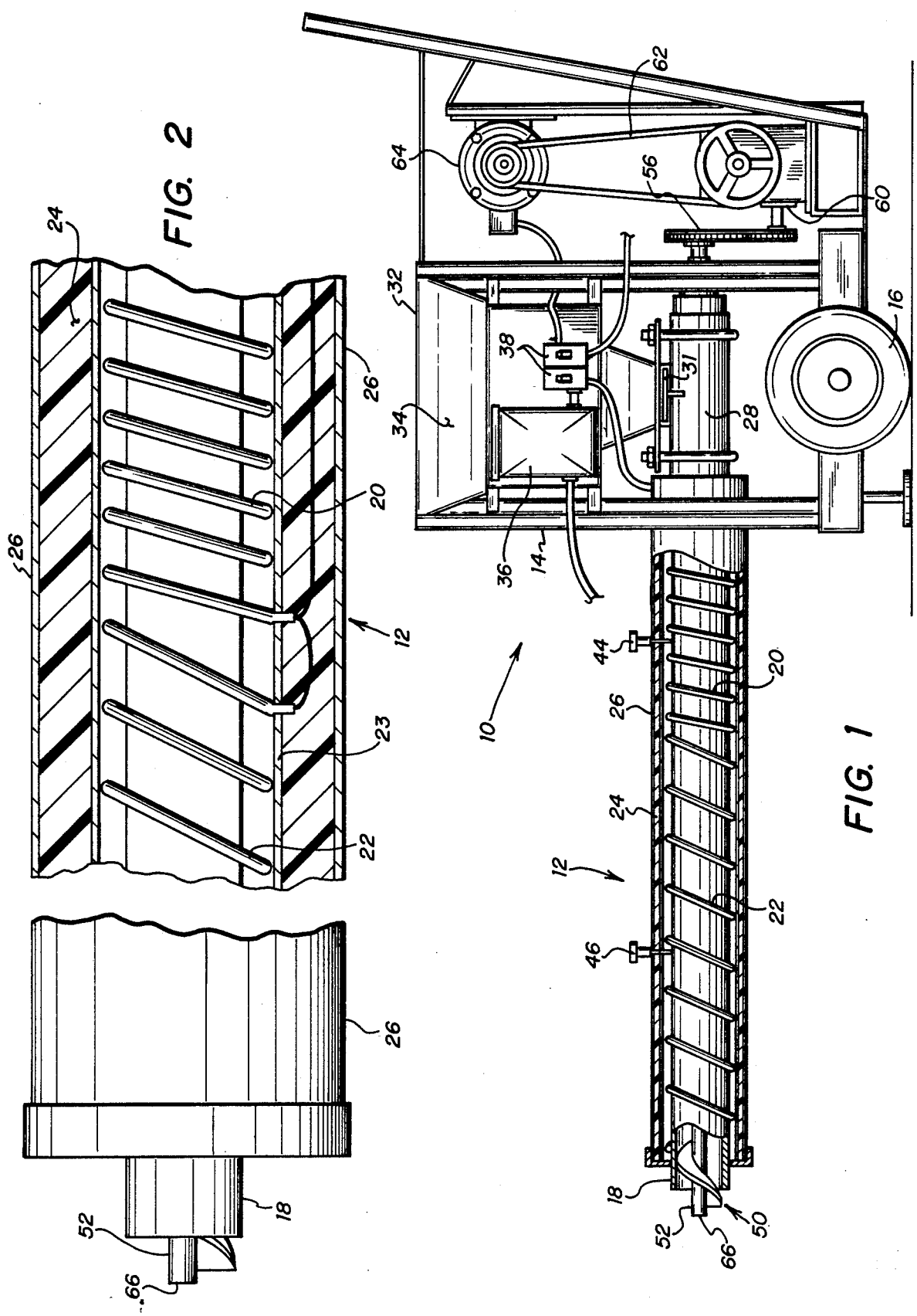

APPARATUS FOR APPLYING A SULPHUR-BASED STRUCTURAL MATERIAL TO PAVED SURFACES

BACKGROUND OF THE INVENTION

This invention relates generally to structural material having utility in repairing paved surfaces such as highways, streets, parking lots and the like; more specifically, it relates to an apparatus and process for the repair of chuck holes in such improved surfaces by filling them with a sulphur-based material which is capable of supporting structural loads.

It is well known that highways, streets, roads, parking lots, airport taxiways and other paved surfaces tend to experience localized failure from time to time. If the failure is substantial, an entire section of the surface may need to be removed and replaced; or resurfacing may seem to be the appropriate cure for a given set of problems. But if the failure is relatively small, it is usually economically feasible to patch an area by filling any voids and restoring the previously established top plane of the improved surface. This is commonly described as simply filling chuck holes (sometimes also called chug holes or pot holes) and smoothing the top surface of the replaced area so as to recreate a planar surface for vehiclular travel.

A variety of materials for chuck hole repair have been proposed and used from time to time, including asphalt, concrete, epoxy and other polymers, and sulphur-based compounds. The success or failure of these previously suggested materials for filling chuck holes perhaps should have been attributed as much to ambient weather conditions, road moisture, aggregate quality, or operator skill as much as anything else; but it is certain that heretofore there has not seemed to be the perfect compromise between achieving a durable repair job in a speedy fashion at an economical price with minimal risk to maintenance men, adjacent traffic, or the environment. Hence, there has remained a need for a reliable patching material for chuck holes and the like that can be installed with portable equipment by relatively unskilled workers and posing no threat to either the workers or the environment. It is an object of this invention to provide such a material as well as a process and an apparatus for using it.

It is a further object to provide a sulphur-based material which can be made to readily adhere to the sides of a chuck hole so as to form a permanent bond therewith.

A further object is to provide an apparatus which can be used to efficiently prepare a sulphur-based patching material for filling chuck holes without contributing to any unnecessary waste.

One more object is to provide a trailer-mounted system for patching chuck holes in which every device that will likely be useful may be conveniently carried on a single trailer—with the result that essentially any sturdy vehicle may be employed to tow the trailer and thereby transport the road-patching system to a location where it may be needed.

These and other objects will be apparent from a reading of the specification and the claims appended thereto, with appropriate reference to the drawings provided herewith.

DESCRIPTION OF THE FIGURES OF THE DRAWING

FIG. 1 is a side elevational view, partially sectioned, showing the left side of a preferred embodiment of the invention.

FIG. 2 is a cross-sectioned, elevational view of an electrically heated furnace as illustrated in FIG. 1.

BRIEF DESCRIPTION OF THE INVENTION

Figure 3:
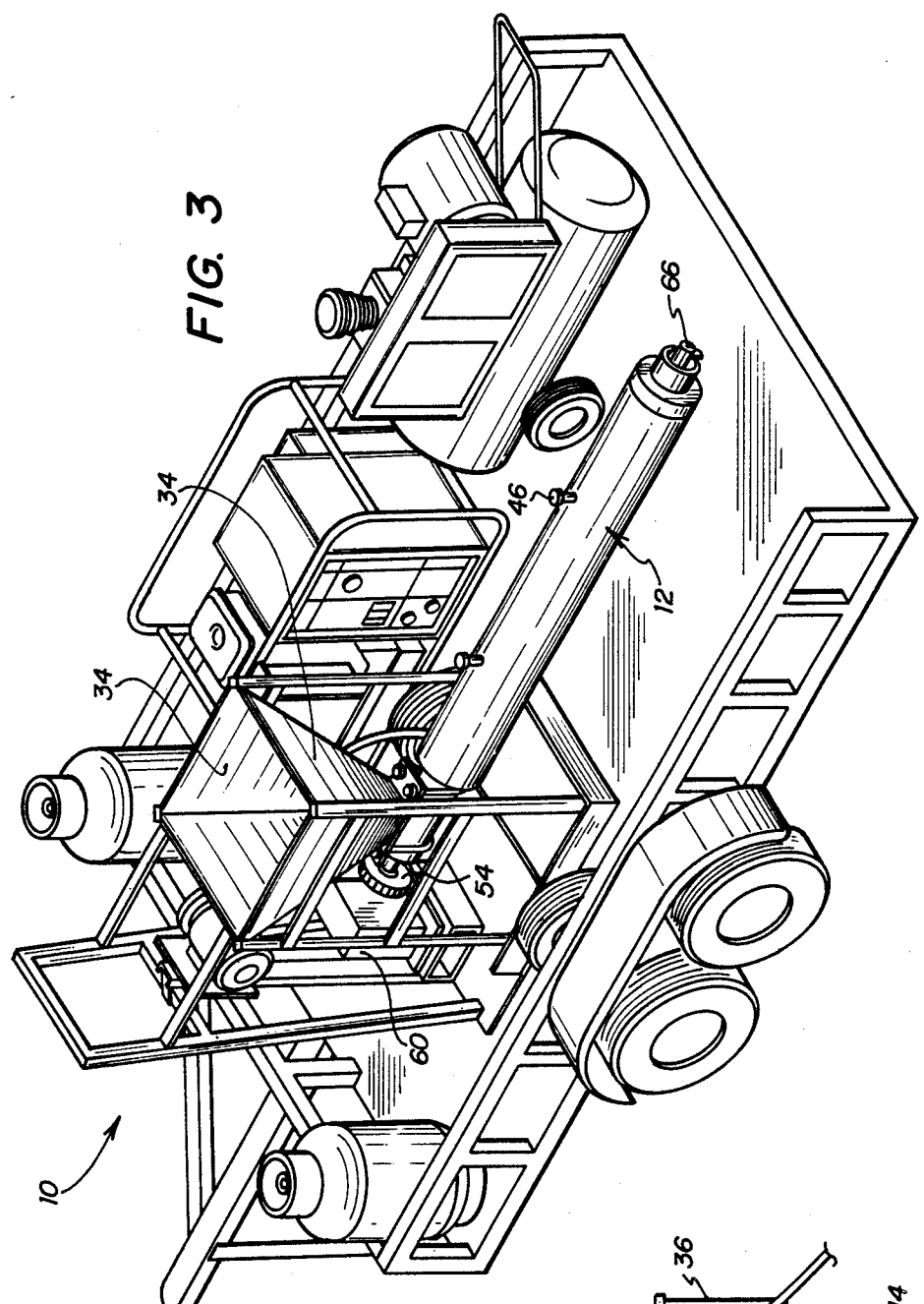
FIG. 3 is a perspective view of a mobile apparatus as shown in FIG. 1, mounted for transport on a trailer—along with appropriate auxiliary equipment.
Figure 4:
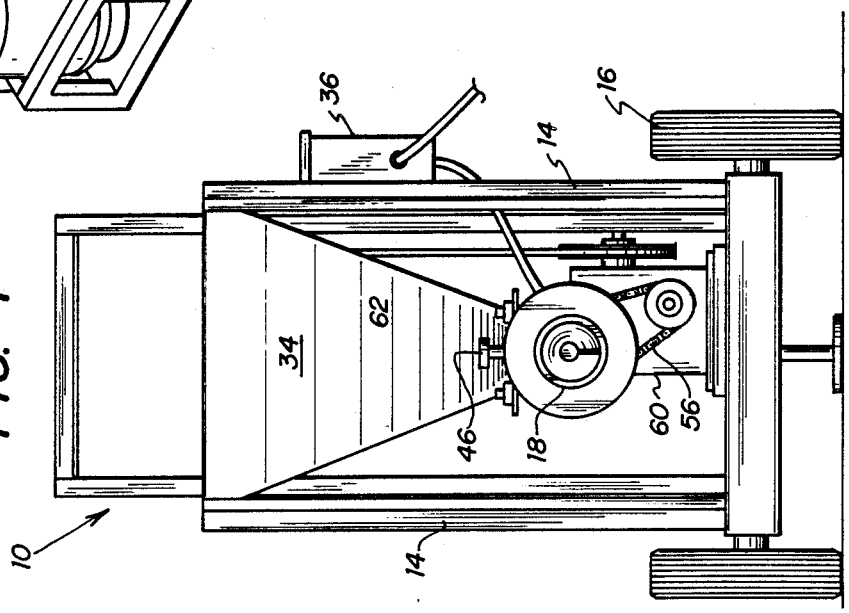
FIG. 4 is a front elevational view of the apparatus shown in FIG. 1.
Figure 5:
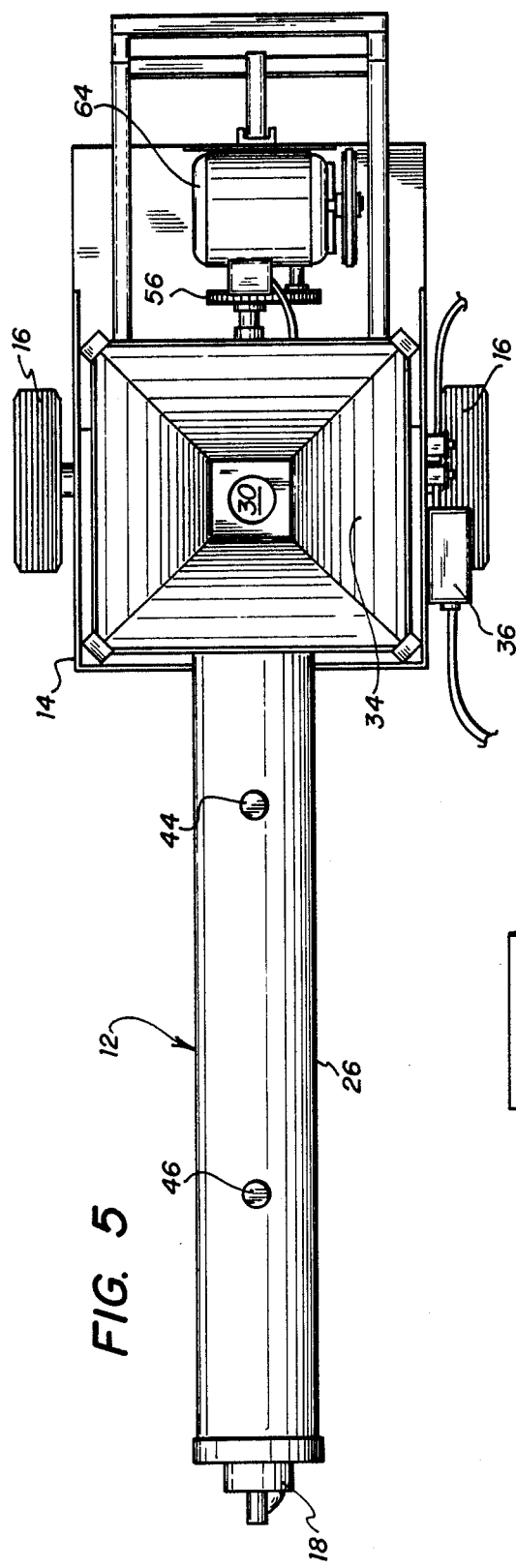
FIG. 5 is a top plan view of the apparatus shown in FIG. 1.
Figure 6:
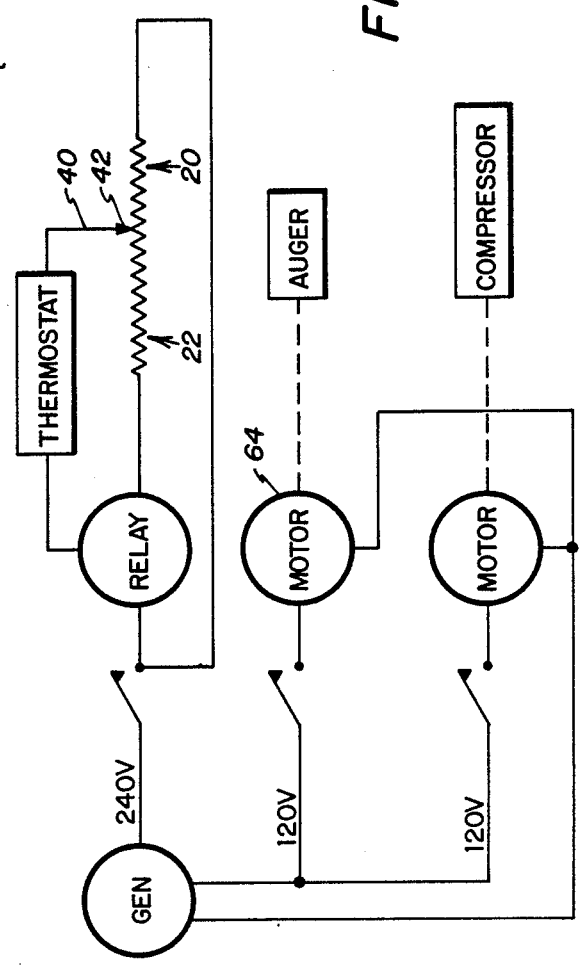
FIG. 6 is a schematic electrical diagram showing an exemplary wiring scheme for an apparatus like that shown in FIG. 1.

In brief, the invention includes an electrically heated furnace in which an auger is mounted for the purpose of moving a sulphur-based material through the furnace at a controlled rate, such that the material will be elevated to a temperature of above 305 degrees Farenheit (the melting point of sulphur) to produce a tenacious filler material. The furnace is fed by a hopper that is mounted above the entry point for the auger, so that dry material may be fed—by gravity—into the furnace whenever a gate-valve mechanism is opened. The furnace and its hopper are relatively light weight, typically weighing only about 360 pounds, and are readily moved about by one person when supporting wheels are installed on the bottom of a frame that supports the furnace. A tandem-axle trailer provides an optimum way of transporting the furnace, as well as a quantity of the sulphur-based material in water-proof bags, a portable generator for powering the electric furnace, and a small air compressor for use in blowing dirt and debris out of a chuck hole prior to adding the heated filler material. An optional accessory which can also be readily carried on such a dual-axle trailer is one or more propane bottles for use in supplying a propane-fired heater; the purpose of the heater is to blow hot air into a chuck hole, for driving off any residual moisture before the filler material is added.

DETAILED DESCRIPTION OF A PREFERRED EMBODIMENT OF THE INVENTION

Referring initially to FIG. 1, a preferred embodiment of the invention includes a wheel-mounted apparatus 10 which consists principally of an elongated furnace 12 that is horizontally oriented and projects forwardly from a frame 14 on which are mounted a pair of supporting wheels 16. The furnace 12 includes a heating tube 18 which preferably is a smooth-wall piece of seamless steel pipe having an internal diameter of about 4 inches. Wrapped around the heating tube 18 and resting in intimate contact therewith are first and second heater elements 20, 22. Suitable heating elements can be fabricated from linear Watrod tubular heating elements that are sold by the Watlow Company of St. Louis, Mo.; the standard linear elements are modified by wrapping them in a spiral fashion about a mandrel to create a spiral or helical heating device. The mandrel should be approximately the same size as, and possibly just a bit smaller than, the OD of the heating tube 18, so that there will be a rather close fit between an installed heater element 20, 22 and the heating tube.

The first heating element 20 is preferably 80 inches long when in its full, extended length—as it comes from the factory, and is rated at 2400 watts; it is bent to provide coils which have a pitch of 3½ inches—so as to provide a relatively high heating capability at the entrance end of the furnace. A suitable heating rod is a 0.315 inch Incoloy Watrod available from the Watlow Company. The second heater element 22 is preferably 100 inches long when fully extended; when rated at 30 watts per square inch of surface area, it will provide the output of a 3000 watt heater. It also is bent about a mandrel so as to provide helical coils, to surround the tube 18, but it may have a larger pitch, e.g., 5½ inches. This larger pitch provides a gradual, sustained heat-transfer region at the down-stream or discharge end of the furnace. While the nominal length of the two heater elements 20, 22 as they come from the factory totals 180 inches, they extend for only about 54 inches after they have been bent around the mandrel. For safety, the last few inches of the furnace (e.g., about four or five inches) are not enveloped by any of the heater coils, so that there is less risk of a truly high-temperature spot being exposed where a worker could accidentally come into contact with it. An inner jacket 23 of 24-gauge metal surrounds the heater elements 20, 22 and provides an air-filled cover to assist in distributing heat in a more nearly uniform manner from the heater elements to the exterior of the tube 18. That is, the jacket or shroud 23 tends to eliminate a condition that might otherwise be realized from the use of localized heater elements, namely, very hot spots (immediately adjacent the heater elements 20, 22) that are separated by intermediate spaces that are at a significantly lower temperature. This design therefore promotes a uniform wall temperature for the tube 18.

To keep the heat concentrated around the heating tube 18, insulation is advantageously placed around the jacket 23 and the heater elements 20, 22 that it envelops. A suitable insulation package 24 is formed by wrapping a 2 inch blanket of mineral fiber insulation (which is available from any of several manufacturers) around the jacket 23. One particularly effective insulation material is a "Therma-Fiber" fire blanket available from United States Gypsum Accoustical Products So. of Chicago, Ill. It is reportedly made in accordance with NFIPA Standard 220-7. To surround the insulation 24 and provide an essentially weatherproof package for the furnace, a metal shell 26 having a diameter of about 10 inches is advantageously provided.

Positioned in the heating tube ahead of the heating elements 20, 21 is a loading section 28, which is essentially a relatively passive section of the steel tube into which a top aperture 30 has been cut. Immediately above the aperture 30 is the discharge end of a hopper 32, said hopper having four slanted sides 34 which are welded to form a seamless reservoir for holding one bag of the preferred material for filling chuck holes. In view of the fact that most chuck holes can be filled with one cubic foot (or less) of filler material, the hopper 32 has a size to readily accomodate at least one cubic foot—and probably 1½ cubic feet—of the sulphur-based material. This is accomplished by providing a hopper having an opening which is shaped in the form of a square, and having sides about 18 inches long; the opening tapers to the lower discharge end which is square shaped with sides about 6 inches long. The height of the hopper is about 17 inches tall, so each of the four side plates for a preferred hopper is trapezoidal and is specifically defined by having its bases as 17 and 6 inches and its height as 19 inches. By having a hopper 32 with relatively steep sides, feeding the raw material into the loading section 28 is usually accomplished without any problem.

Mounted adjacent the hopper 32 is a control box 36 which contains the appropriate electrical controls for supplying the requisite heat to the furnace 12. This control box 36 may be located in any of a variety of places, but the right-hand side of the hopper 34 seems to be particularly appropriate because it ensures that an on/off switch 38 can be easily accessed, regardless of whether the apparatus 10 is still resting on the trailer or has been removed from the trailer. Any 240 volt, 30 amp single pole, double throw switch will normally be adequate for handling the electrical load for the furnace 12. Also mounted within the control box 36 is a thermostat which can handle the temperatures that will normally be expected with the apparatus 10; a thermostat rated at at least 800° F. is preferred. In a conventional manner, the thermostat is connected to a 240 volt relay, as indicated in FIG. 2. Also leading into the control box 36 is a thermocouple wire 40 that is connected to the thermostat at one end and a thermocouple 42 at its other end. By using a thermostat to control the supply of heat (through elements 20, 22) to the furnace 12, the operator can concentrate his attention on filling chuck holes and he does not have to worry about overheating the furnace.

Mounted within the heating tube 18 is an auger 50 which has a diameter slightly less than that of the ID of the tube, e.g., about 4 inches. The preferred pitch for the auger is approximately 4 inches, and a central supporting shaft 52 about 1 inch in diameter extends for the full length of the heating tube—plus one or two extra inches. One end of auger shaft 52 has affixed thereto a sprocket 54 which is adapted to be driven through a chain 56 by another sprocket 58 and speed reducing gear 60. This speed-reducing gear 60 is, in turn, driven through belt 62 by a conventional 120 volt (50 or 60 Hertz) electric motor rated at approximately one horsepower when rotating at a nominal 1750 RPM. The motor 64 is preferably activated by its own on/off switch, so that the auger may be rotated independently of furnace operation.

The downstream end of the auger tube 52 preferably protrudes outwardly from the heating tube 18 by a short distance, e.g., 1 or 2 inches, which is usually enough length for a pipe wrench or an equivalent tool to engage. By making the auger tube 52 long enough so that its end 66 is exposed, an operator could manually turn the auger with a pipe wrench or similar manually actuated tool if power to the motor 64 should happen to be interrupted; this might happen, for example, if the electric generator ran out of fuel. In this manner, the heating tube 18 might be manually emptied, even if no electric power is available. Of course, initially disconnecting the chain to the speed reducer would make it easier to manually rotate the auger by applying torque to some exposed portion of the auger.

To further ensure that feeding raw material into the furnace is easy, the material is preferably kept in moisture-proof bags so that it is not susceptible to absorbing moisture out of the air, or absorbing any moisture that might be present as a result of rain, snow, etc. A suitable container is a Kraft paper bag with a polyetheylene liner, much like the bags in which Portland cement is sometimes packaged. A bag of the preferred material for filling chuck holes in accordance with this invention will contain approximately one cubic foot of material and will weigh about 84 pounds.

Referring specifically to the material which is advantageously used in the apparatus described herein, a preferred thermoplastic material comprises a mixture of pelletized or flaked sulphur, No. 2 blasting sand, pea gravel (ranging from ⅛ inch to ⅜ inch), and Portland cement. The preferred ratio of the material components, by volume, is two parts of sulphur, three parts of blasting sand, one part of dry pea gravel, and one-half part of Portland cement. Pelletized or flaked sulphur is preferred over powdered sulphur because it is less dusty and the risk of an explosion is thereby reduced. Also, volumetric measurements are easier with pelletized or flaked sulphur, because it does not tend to pack like powdered sulphur will. The sulphur may be of essentially any good commercial grade, e.g., about 99% pure; but impurities greater than 1 percent would probably not be ruinous, as long as appropriate adjustments are made in the quantity of sulphur that is used. That is, if sulphur of only 95 percent purity is used (because it is available at a greatly reduced price, etc.), the overall quantity of sulphur would naturally need to be increased somewhat—to produce the adhesion that is desirable. If the sulphur is pelletized, the pellets should be relatively small (e.g., No. 2 grade) to foster good mixing and rapid heating. In cold weather conditions, when melting the sulphur may take longer than it does in warm weather, flaked sulphur may be preferred, because it tends to melt more easily than do pellets. Suitable sulfur may be obtained from International Chemical Co. of Mount Pleasant, Tex. No. 2 pelletized sulfur from this company will typically have only 5 percent of its pellets as large as 8/32 inch and perhaps 30 percent as small as 1/32 inch; the average pellet size will be about 3/32 inch. The flaked sulfur will typically have about 2 percent of its flakes as large as 8/32 inch long, and about 10 percent may be as short as 1/32 inch. Nearly 80 percent of the flakes will be about 3/32 inch long; and almost all flakes will be about 1/32 inch thick.

Blasting sand is preferred over mortar or "play" sand because of the relatively sharp corners that characterize the individual grains of sand; the sharp corners and the planar sides of this particular type of sand also seem to prevent the material from becoming compacted in its unfinished condition, such that it feeds into the auger quite readily from the described hopper 32. Number 2 blasting sand also seems to contribute to a desired strength in the finished material after it has been heated and placed into a chuck hole or the like. There are four grades of blasting sand; the No. 1 grade sand is believed to be too fine to contribute to the desired strength in the finished material, and the No. 4 grade is believed to be too coarse. While No. 3 grade might be acceptable, No. 2 grade is definitely preferred. With regard to the pea gravel, there are four grades of pea gravel which are commonly recognized, and the fourth or largest grade is the preferred material for this composition; however, the smaller No. 2 grade is probably serviceable. Anything larger than No. 4 pea gravel will probably be more commonly identified as a small rock instead of as a piece of gravel.

A mixture of these four materials may be supplemented by adding chopped fiberglass fibers, to further enhance the structural integrity of the finished work. An appropriate size for such fiberglass fibers has been found to be about one-half inch long, but a length of as much as one and one-half inches has also been determined to be quite satisfactory. If added to the basic material, the chopped fiberglass fibers should probably comprise no more than about 0.2% of the total mixture, by weight.

A thermosetting mixture as described above may be stowed in a satisfactorily dry condition using polyethylene-lined bags for numerous days; and, if at least some reasonable care is taken in handling the bags (so that they are not accidentally punctured), they may usually be stored in areas that are not 100% weatherproof. Hence, the bags of material may be kept on a trailer and simply covered with a tarp or the like—to ensure that even heavy rains or snow will not cause a rapid deterioration in the quality of the material.

Turning next to operation of the apparatus 10, it will be assumed that a trailer which is outfitted in accordance with the suggestions herein has been pulled to a site where it has been determined that several bothersome chuck holes are present in a roadway. The towing vehicle (e.g., a pickup truck, a van or another utility vehicle) together with the trailer may be pulled safely to the side of the roadway and parked. The matter of trailer parking may be recognized by some as being one significant feature of the apparatus disclosed herein, because the trailer does not have to be parked on a level road immediately next to a chuck hole that is to be filled—as is the case with many devices of the prior art. Also, the apparatus disclosed herein is not particularly sensitive to its orientation or inclination. This is because the auger 50 described herein will probably transport the thermoplastic material through the heating tube very nicely in either its granular or molten state, regardless of how the tube is tilted, inclined or oriented. So as long as the sulfur-based material can be fed into the first end of the heating tube, the apparatus should be capable of doing the job that is expected of it.

The first operational step for a road crew of one or more persons will usually be to erect a barricade so as to divert traffic around the first chuck hole that is to be repaired. Next, the electric generator is started so as to provide the requisite power for operating the air compressor and to begin heating the furnace 12. A flexible hose is employed to direct compressed air into the chuck hole for the purpose of removing loose particulate matter and achieving at least some preliminary drying of the hole. If there is any doubt at all about some residual moisture in the chuck hole, a propane torch operatively connected to a 25-pound portable propane bottle may be quickly and easily moved to the chuck hole so as to heat the interior surface of the chuck hole and drive off any residual moisture. Hole preparation as described above should probably take less than 15 or 20 minutes, which is usually enough time for the furnace to reach its operating temperature of about 350° F., depending—of course—upon ambient conditions. That is, on a cold winter day when the air temperature is below freezing, it will naturally take a few minutes more to heat the furnace than will be the case on a hot summer day. When the rear temperature gauge, i.e., gauge 44, has reached a temperature of about 400° Farenheit, a bag of the preferred mixture is opened and the contents poured into the top of the hopper 32. The gate 31 above loading aperture 30 is then opened so that the material will begin to flow by gravity through the aperture into the loading section 28. Driving motor 64 for the auger is then switched to its "on" condition, causing the thermoplastic material to be fed into the furnace 12. The auger 50 is rotated at a modest speed of about 11 revolutions per minute, so that the material will move rather slowly through the furnace 12 in order that that it will be thoroughly and adequately heated.

The greater concentration of heating rod coils in the first section of the furnace 12 will typically provide a higher temperature in that first section, and this higher temperature will therefore provide a desired thermal "jolt" to the thermoplastic material, bringing it quickly to an elevated temperature. The more widely spaced coils in the second, downstream section of the furnace 12 will provide an adequate sustaining heat load, and will keep it above the 305° F. melting temperature for sulphur. In fact, a reading on a temperature gauge 46 immediately next to the downstream coils will usually be about 360°. (Of course, the temperature inside the furnace will normally be somewhat less than the temperature outside the heating tube 18 where the heating elements are mounted.) The total transit time for material through the furnace will usually be less than 3 minutes, e.g., about 2½ minutes.

The heated material which is expelled from the open end of the furnace 12 will ideally be a mottled gray, which will be an indication to the operator that the mixture has reached an acceptable temperature and is now an effective plasticized mass for pouring into a chuck hole. If the material being expelled from the furnace 12 is too dark, this will be an indication that the furnace is too hot and the sulpher binder has begun to "smoke." If the expelled material is not adequately heated, it may simply be accumulated at the discharge end of the furnace and used as a modest "filler" in a very deep chuck hole, wherein the initial adhesion of the "filler" will not be so critical, and wherein the residual heat of the surrounding material will usually bring the "filler" piece to the desired elevated temperature. Any initial deficiency in melting the first quantity of material that passes through the furnace will inevitably be corrected after a short time—as the furnace heats up.

After the chuck hole has been filled with the molten or at least semi-plastic material, the surface of the repaired spot may be finished with simple concrete-finishing tools such as a trowel or the like. If the second hole to be patched is fairly close to the first one, the apparatus 10 may be left in its secured position on the trailer, and the plasticized material may be hand-carried to a second (or any subsequent) chuck hole in an ordinary galvanized bucket. Alternatively, the apparatus 10 may be unbolted from the clamps which hold it securely to the trailer, and the apparatus may be easily transported on the pair of wheels 16 to a remote chuck hole that needs repairs. In view of the fact that extension cords of 100 feet or even 200 feet are routinely available, the apparatus 10 may be rolled as far away from the trailer as an electrical extension cord will permit it to move away from the electrical generator.

After all of the chuck holes have been filled and their surfaces smoothed with a concrete trowel or the like, the operator will typically turn the furnace off and clean—and cool—the furnace by passing a couple of buckets of ordinary sand through the furnace in the same manner that the thermoplastic material is passed through the furnace. The cleaning sand will help ensure that the auger is kept free of any residual material, and that the furnace does not become plagued by any of the patching material that solidifies within the furnace.

However, even if some of the material does solidify within the furnace, it will be returned to a molten state whenever the furnace is again heated above 305° F., so no permanent blockage of the auger is caused by failure to thoroughly clean the tube 18.

By the time the operator has cleaned the furnace by passing a bucket or two of sand through it and has accumulated the few working tools back on the trailer, the material in the chuck hole will have hardened to the extent that it will be able to promptly carry road traffic. Therefore, by the time that the road barriers have been retrieved and stowed, the road will usually be in condition to accept ordinary traffic; of course, on a particularly hot day, a few extra minutes of curing time may be prudently provided to ensure that a heavy truck does not cause any damage to the freshly set material. The operator and, if applicable, his helper, may then drive the towing vehicle back to its storage lot or to another location where the road-patching process may be repeated.

In considering the various parameters of the apparatus 10, it may be advantageous to mention that there is a fairly definite relationship between the length and diameter of the heated portion of the furnace tube 18, the rotational speed of the auger 50, and the heat input of the heating elements—expressed in amps. In fact, it would be practicable to establish a formula for the guidance of those persons who might wish to alter some of the dimensional relationships that have been described hereinabove. For those who might wish to lengthen the furnace 12, change the diameter of the heating tube 18, or substitute a different heating element than those described as being preferred for heaters 20, 22, something at least close to the following relationship should be observed:

$$\frac{L \times \text{amps}}{D \times S} = K$$

where
L is the length of the heated portion of the furnace, in inches,
D is the diameter of the heating tube, in inches, and
S is the rotational speed of the auger, in revolutions per minute.

As long as the exemplary values given in the description of the preferred embodiment are not exceeded by more than 100%, it is believed that the value of K should be about 26. For alterations which exceed the preferred values by more than 100%, there may be a necessity to include an adjustment factor in order to maintain accuracy in establishing relative sizes and relationships. This is caused, in part, because it must be remembered that the heating elements 20, 22 are located at the periphery of a cylindrical heating tube 18, and it obviously takes some time for heat to pass all the way through the thermoplastic material so as to render it plastic, especially if some of the material tends to move immediately next to the central tube 52. With the possible exception of reducing the length of the tube, the above formula should provide good guidance for those who might wish to make reasonable alterations in the specific apparatus described above. Increasing the tube length should not pose much of a problem, if space permits; but reducing it below 60 inches might be running the risk of not allowing enough time to bring the thermosetting material to a uniform and sufficiently high temperature before it is discharged, especially if the ambient temperature is extremely cold. Therefore, 5 feet may be considered to be a prudent lower limit for tube length.

While only the preferred embodiment of the invention has been disclosed in great detail herein, it will be apparent to those skilled in the art that modifications can be made without departing from the spirit of the invention. Thus, any specific structure shown herein is intended to be exemplary and is not meant to be limiting, except as described in the claims appended hereto.

What is claimed is:

1. Apparatus for preparing a sulphur-based thermoplastic material for use in patching chuck holes in a paved surface and the like, comprising:
a first assembly that includes
   (a) a tube having first and second ends and being adapted to receive ambient material at its first end and expel heated material at its second end, said tube being generally linear and having a length in excess of about five feet;
   (b) a receptacle for receiving a thermoplastic material in granular form and directing such material into a first heating station within the tube;
   (c) an auger mounted for rotation within the tube, said auger including a spirally wrapped blade whose diameter is slightly less than the inner diameter of the tube, and the auger having a central supporting shaft which is supported by at least one bearing that is concentric with the tube;
   (d) means for heating the exterior wall of the tube so as to bring the initially granular material in the tube to at least a semi-plastic state;
   (e) drive means for rotating the auger at a controlled and relatively slow rate so as to progressively transport thermoplastic material through the tube; and
   (f) means for adjusting operation of the heating means so as to achieve a temperature of at least 305° Fahrenheit within the tube and to maintain said temperature for about three minutes, whereby a sulphur-based material may be passed through the heating tube and reach the melting point of sulphur during said passage;
and further including
   (g) a wheeled vehicle for supporting and transporting the first assembly over a paved surface to a work site, and further including auxiliary wheel means for rendering the first assembly mobile when it is separated from the wheeled vehicle, whereby the first assembly may be selectively separated from the wheeled vehicle and manually rolled to a desired location near the wheeled vehicle where the repair of chuck holes is required.

2. Apparatus for preparing a sulphur-based thermoplastic material for use in patching chuck holes and the like in a paved surface, comprising:
   (a) a tube having first and second ends and being adapted to receive ambient material at its first end and expel heated material at its second end, said tube being generally linear and having a length in excess of about five feet;
   (b) a receptable near the first end of the tube for receiving a pre-mixed sulphur-based thermoplastic material in granular form and directing such material into a first heating station within the tube;
   (c) an auger mounted for rotation within the tube, said auger including a spirally wrapped blade whose diameter is slightly less than the inner diameter of the tube, and the auger having a central supporting shaft which is supported by at least one bearing that is concentric with tube, and the auger having at least one end portion that is adjacent the second end of the tube, said end portion being sufficiently exposed and configured that it may be selectively engaged at all times with a manually actuated tool, whereby the auger may be manually rotated in the event that power to its drive means is interrrupted;
   (d) electrical heating means for circumferentially heating the exterior wall of the tube so as to bring the initially granular thermoplastic material in the tube to at least a semi-plastic state;
   (e) a portable generator which is adapted to serve as a portable source of electrical power, and means for connecting said portable generator to said electrical heating means;
   (f) drive means for rotating the auger at a controlled and relatively slow rate so as to progressively transport the thermoplastic material through the tube from the first end to the second end; and
   (g) means for adjusting operation of the heating means so as to achieve a temperature of at least 305° Fahrenheit within the tube and to maintain said temperature while the thermoplastic material is being mixed and heated for about three minutes, whereby a sulphur-based thermoplastic material may be passed through the tube and reach the melting point of sulphur during said passage.

3. Apparatus for preparing a sulphur-based thermoplastic material for use in patching chuck holes and the like in a paved surface, comprising:
   (a) a tube having first and second ends and being adapted to receive ambient material at its first end and expel heated material at its second end, said tube being generally linear and having a length in excess of about five feet;
   (b) a receptacle near the first end of the tube for receiving a pre-mixed sulphur-based thermoplastic material in granular form and directing such material into a first heating station within the tube;
   (c) an auger mounted for rotation within the tube, said auger including a spirally wrapped blade whose diameter is slightly less than the inner diameter of the tube, and the auger having a central supporting shaft which is supported by at least one bearing that is concentric with tube;
   (d) electrical heating means for circumferentially heating the exterior wall of the tube so as to bring the initially granular thermoplastic material in the tube to at least a semi-plastic state, and wherein the electrical heating means includes a resistance element that is wrapped in a spiral fashion around at least a portion of the exterior wall of the tube, and wherein the spiral element includes two longitudinal sections which have different pitches, and the first section through which the thermoplastic material passes has a smaller pitch than the pitch of the second section;
   (e) a portable generator which is adapted to serve as a portable source of electrical power, and means for connecting said portable generator to said electrical heating means;
   (f) drive means for rotating the auger at a controlled and relatively slow rate so as to progressively transport the thermoplastic material through the tube from the first end to the second end; and (g) means for adjusting operation of the heating means so as to achieve a temperature of at least 305° Fahrenheit within the tube and to maintain said temperature while the thermoplastic material is being mixed and heated for about three minutes, whereby a sulphur-based thermoplastic material may be passed through the tube and reach the melting point of sulphur during said passage.

* * * * *